(12) United States Patent
Takahashi

(10) Patent No.: US 11,155,700 B2
(45) Date of Patent: Oct. 26, 2021

(54) TIRE PUNCTURE SEALANT

(71) Applicant: THE YOKOHAMA RUBBER CO., LTD., Tokyo (JP)

(72) Inventor: Kiyohito Takahashi, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 245 days.

(21) Appl. No.: 16/606,054

(22) PCT Filed: Apr. 18, 2018

(86) PCT No.: PCT/JP2018/016042
§ 371 (c)(1),
(2) Date: Oct. 17, 2019

(87) PCT Pub. No.: WO2018/194104
PCT Pub. Date: Oct. 25, 2018

(65) Prior Publication Data
US 2020/0040164 A1 Feb. 6, 2020

(30) Foreign Application Priority Data

Apr. 18, 2017 (JP) .............................. JP2017-082054

(51) Int. Cl.
C08L 7/02 (2006.01)
B29C 73/02 (2006.01)
C08K 7/02 (2006.01)
C08L 1/10 (2006.01)

(52) U.S. Cl.
CPC ................ *C08L 7/02* (2013.01); *B29C 73/02* (2013.01); *C08K 7/02* (2013.01); *C08K 2201/003* (2013.01); *C08L 1/10* (2013.01)

(58) Field of Classification Search
CPC ....... C08L 7/02; C08K 7/02; C08K 2201/003; B29C 73/02
See application file for complete search history.

(56) References Cited

U.S. PATENT DOCUMENTS 4,501,825 A * 2/1985 Magyar ................. B29C 73/163
152/504
6,264,732 B1 * 7/2001 Tanaka ............... B29D 30/0685
106/33

FOREIGN PATENT DOCUMENTS

JP 2005-187751 A 7/2005

* cited by examiner

*Primary Examiner* — Edward J Cain
(74) *Attorney, Agent, or Firm* — Carrier Blackman & Associates, P.C.; Joseph P. Carrier; William D. Blackman

(57) ABSTRACT

The object of the present invention is to provide a tire puncture sealant having excellent sealing property, storage property, and injection property. The tire puncture sealant of the present invention contains a rubber latex and/or a resin emulsion and a cellulose fiber having a maximum fiber diameter of less than 1,000 nm, the cellulose fiber containing cellulose that optionally has a functional group.

20 Claims, No Drawings

TIRE PUNCTURE SEALANT

TECHNICAL FIELD

The present invention relates to a tire puncture sealant.

BACKGROUND ART

In recent years, there has been an increase in instances where a puncture repair kit is introduced as standard equipment or optional equipment in an automobile. For the puncture repair kit, a package in which a tire puncture sealant and a compressor are combined is known.

When a tire punctures, the tire can be restored to a state in which the tire can be driven again by using the puncture repair kit in a manner in which a tire puncture sealant is injected into the tire from the valve of the tire using a compressor or the like, and the tire is rotated.

The tire puncture sealant may include, for example, a sealant containing a rubber latex and a thickener (for example, Patent Document 1).

Patent Document 1 describes a puncture sealant containing at least rubber latex and a thickener, wherein a rubber latex solution containing the rubber latex and a thickener solution containing the thickener are mixed before use. Patent Document 1 also describes that short fibers are contained in the thickener solution.

CITATION LIST

Patent Literature

Patent Document 1: JP 2005-187751 A

SUMMARY OF INVENTION

Technical Problem

The tire puncture sealant is typically required to have a sealing performance capable of sealing a puncture hole. A tire puncture sealant containing a resin emulsion may have a low sealing property (Comparative Example 5). As a means for improving the sealing performance described above, it is thought to increase an amount of natural rubber latex in the tire puncture sealant.

However, when the amount of the natural rubber latex is increased, the tire puncture sealant is separated and cream (membrane) tends to occur during storage, and when the tire puncture sealant is injected into the tire, there is a problem in which the sealant is clogged in a valve and the injection time into the tire is extended.

Under such circumstances, the present inventors have prepared a composition in which a cellulose fiber is added to rubber latex or to rubber latex and a resin emulsion referring to Patent Document 1, and the evaluation thereof have been made. As a result, it has been clear that such a composition may have at least either of a low storage property and a low injection property.

Accordingly, an object of the present invention is to provide a tire puncture sealant having excellent sealing property, storage property, and injection property.

Solution to Problem

As a result of diligent research to solve the above problems, the present inventors have found that desired effects can be obtained by adding a cellulose fiber having a cellulose that optionally has a functional group and having a maximum fiber diameter of less than 1000 nm to a tire puncture sealant containing rubber latex and/or a resin emulsion, and have arrived at the present invention.

The present invention is based on the findings described above and, specifically, solves the problem described above by the following features.

1. A tire puncture sealant containing: a rubber latex and/or a resin emulsion; and a cellulose fiber having a maximum fiber diameter of less than 1000 nm, the cellulose fiber containing cellulose that optionally has a functional group.

2. The tire puncture sealant according to 1 above, wherein the cellulose fiber has a number average fiber diameter from 2 to 150 nm.

3. The tire puncture sealant according to 1 or 2 above, wherein the cellulose fiber is contained in a content from 0.01 to 5.0 parts by mass, based on 100 parts by mass of a content 1 of solid matter in the rubber latex, or 100 parts by mass of a content 2 of solid matter in the resin emulsion.

4. The tire puncture sealant according to any one of 1 to 3 above, wherein the cellulose fiber has a maximum fiber diameter of 500 nm or less, and a number average fiber diameter from 2 to 100 nm.

5. The tire puncture sealant according to any one of 1 to 4 above, wherein the cellulose fiber has a maximum fiber diameter of 30 nm or less, and a number average fiber diameter from 2 to 20 nm.

6. The tire puncture sealant according to any one of 1 to 5 above, wherein the functional group is at least one selected from the group consisting of a carbonyl group and an alkoxy group.

7. The tire puncture sealant according to any one of 1 to 6 above, wherein the cellulose fiber contains cellulose having a functional group, and the functional group is contained in a content from 0.1 to 2.2 mmol/g relative to the cellulose fiber.

8. The tire puncture sealant according to any one of 1 to 7 above, wherein the cellulose fiber is dispersed in a medium of the tire puncture sealant.

9. The tire puncture sealant according to any one of 1 to 8 above, containing the rubber latex and the resin emulsion, wherein the cellulose fiber is contained in a content from 0.01 to 10.0 parts by mass, based on 100 parts by mass of a total amount of the content 1 of the solid matter in the rubber latex and the content 2 of the solid matter in the resin emulsion.

Advantageous Effects of Invention

The tire puncture sealant of the present invention has excellent sealing property, storage property, and injection property.

DESCRIPTION OF EMBODIMENTS

Embodiments of the present invention will be described in detail below.

Note that, in the present specification, (meth)acrylate represents acrylate or methacrylate, (meth)acryloyl represents acryloyl or methacryloyl, and (meth)acryl represents acryl or methacryl.

Furthermore, in the present specification, numerical ranges indicated using "(from) . . . to . . . " include the former number as the lower limit value and the later number as the upper limit value.

In the present specification, unless otherwise noted, a single corresponding substance may be used for each component, or a combination of two or more types of corresponding substances may be used for each component. When a component contains two or more types of substances, the content of the component means the total content of the two or more types of substances.

In the present specification, when at least one of the sealing property, the storage property, and the injection property are superior, such a case may be referred to as "exhibiting superior effect of the present invention".

In the present invention, the rubber latex includes rubber as a dispersoid and a dispersion medium, and the rubber is dispersed in the dispersion medium. The resin emulsion includes a resin as a dispersoid and a dispersion medium, and the resin is dispersed in the dispersion medium. In the present invention, the emulsion has a concept including a suspension (in which a solid phase dispersoid is dispersed in a liquid phase dispersion medium), and a system in which a liquid phase dispersoid is dispersed in a liquid phase dispersion medium.

The dispersion medium contained in the rubber latex or the resin emulsion is not particularly limited. It may include, for example, water; a mixture of water and a water-soluble organic solvent.

In the present invention, the solid matter of the rubber latex is rubber. The content of the solid matter in the rubber latex refers to a content of the rubber contained in the rubber latex or a total content of components other than the dispersion medium of the rubber latex. In the present invention, the content of the rubber contained in the rubber latex is substantially the same as the total content of the components other than the dispersion medium of the rubber latex.

In the present invention, the solid mater of the resin emulsion is the resin. The content of the solid matter in the resin emulsion refers to a content of the resin contained in the resin emulsion or a total content of components other than the dispersion medium of the resin emulsion. In the present invention, the content of the synthetic resin contained in the resin emulsion is substantially the same as the total content of the components other than the dispersion medium of the resin emulsion.

In the present invention, the medium contained in the tire puncture sealant refers to an entire remaining component in which the rubber contained in the rubber latex and/or the resin contained in the resin emulsion and the cellulose fibers are excluded from the tire puncture sealant. Note that when the tire puncture sealant of the present invention further contains, for example, a component including a dispersion medium (excluding the rubber latex or the resin emulsion described above), the medium further contains a remaining component in which the dispersoid (solid matter) is excluded from the component including the dispersion medium.

When cellulose fibers are used in an undried state (for example, gel, aqueous solution, or dispersion), the medium contained in the tire puncture sealant may include mediums, which are derived from the usage state of the cellulose fibers.

In the manufacture of the tire puncture sealant of the present invention, when a dispersion medium such as water is further added to the system, the medium can further contain the dispersion medium added, described above.

Tire Puncture Sealant

The tire puncture sealant of the present invention is a tire puncture sealant containing rubber latex and/or a resin emulsion and a cellulose fiber having a maximum fiber diameter of less than 1000 nm, the cellulose fiber containing cellulose that optionally has a functional group.

It is presumed that, in the tire puncture sealant of the present invention, the maximum fiber diameter of the cellulose fibers is narrower (less than 1000 nm), the surface area of the cellulose fibers thus increases, and aggregation of the rubber in the rubber latex and/or the resin in the resin emulsion is suppressed during storage or injection into the tire. Alternatively, it is presumed that when the maximum fiber diameter of the cellulose fibers is narrower, the fibers more easily get in between the rubber in the rubber latex and/or the resin in the resin emulsion, whereby aggregation of the rubber in the rubber latex and/or the resin in the resin emulsion is suppressed during storage or injection into the tire.

However, in the present invention, it is assumed that the predetermined cellulose fiber does not prevent the aggregation when sealing the puncture hole.

As such, it is considered that the tire puncture sealant of the present invention is well-balanced between the aggregation property of the rubber and/or the resin during sealing and the aggregation resistance of the rubber and/or the resin during storage and/or injection.

Each of the components contained in the composition according to an embodiment of the present invention will be described in detail below.

The tire puncture sealant of the present invention contains the rubber latex and/or the resin emulsion.

The rubber contained in the rubber latex and/or the resin contained in the resin emulsion functions to seal a puncture hole.

When the tire puncture sealant of the present invention contains the rubber latex and/or the resin emulsion, the effects of the present invention (particularly the storage property and the injection property) are more excellent.

Rubber Latex

The tire puncture sealant of the present invention can contain the rubber latex.

The rubber latex that can be contained in the tire puncture sealant of the present invention is not particularly limited. The rubber latex may include, for example, natural rubber latex, nitrile rubber latex, styrene-butadiene rubber latex, acrylic rubber latex, and the like.

Among these, natural rubber latex is preferable because the superior effects of the present invention (particularly the sealing property) are obtained. The natural rubber latex is not particularly limited. The natural rubber latex may be any of those from which protein is remover or is not removed.

The rubber latex may be used alone or as a combination of two or more types thereof.

The method for producing the rubber latex is not particularly limited.

A commercially available product may be used as the rubber latex. Specific examples of the commercially available natural rubber latex may include deproteinized natural rubber latex (SeLatex series available from SRI Hybrid Ltd.), deproteinized natural rubber latex (Hytex HA manufactured by Fulflex, Inc. and available from Nomura Trading Co., Ltd.), ultra-low ammonia natural rubber latex (ULACOL, available from Regitex Co., Ltd.), and the like.

Content 1 of Solid Matter in Rubber Latex

In the present invention, the content 1 of the solid matter in the rubber latex is preferably from 10 to 50 mass %, more preferably from 20 to 40 mass %, of the total amount of the tire puncture sealant, because the superior effects of the present invention (particularly the sealing property) are obtained.

Resin Emulsion

The tire puncture sealant of the present invention can contain the resin emulsion.

The resin emulsion that can be contained in the tire puncture sealant of the present invention is not particularly limited.

The resin emulsion may include, for example, vinyl acetate polymer emulsions.

The vinyl acetate polymer emulsion is not particularly limited as long as the vinyl acetate polymer contained in the emulsion is a polymer having repeating units of vinyl acetate.

Vinyl Acetate Polymer Emulsion

The vinyl acetate polymer contained in the vinyl acetate polymer emulsion may be a homopolymer or a copolymer of vinyl acetate.

When the vinyl acetate polymer is the copolymer, a monomer other than the vinyl acetate is not particularly limited as long as the monomer is a compound having an ethylenically unsaturated bond. Examples thereof may include olefins such as ethylene; VeoVa (esters of versatic acid and vinyl alcohol; (meth) acrylic monomers such as (meth)acrylic esters and (meth)acrylic acid; and aromatic vinyl compounds such as styrene.

The vinyl acetate polymer emulsion may include, for example, vinyl acetate homopolymer emulsions and vinyl acetate copolymer emulsions.

The vinyl acetate copolymer emulsion may include, for example, ethylene-vinyl acetate copolymer emulsions.

The ethylene-vinyl acetate copolymer emulsion is preferably at least one emulsion selected from the group consisting of ethylene-vinyl acetate copolymer emulsions, ethylene-vinyl acetate-VeoVa copolymer emulsion, and an ethylene-vinyl acetate-VeoVa-(meth) acrylic monomer copolymer emulsion. The (meth)acrylic monomer forming the ethylene-vinyl acetate-VeoVa-(meth)acrylic monomer copolymer may include, for example, compounds having a (meth)acryloyloxy group (e.g., (meth)acrylic acid esters, and (meth) acrylic acid).

Among these, at least one emulsion selected from the group consisting of the ethylene-vinyl acetate copolymer emulsions and the vinyl acetate homopolymer emulsions is preferable as the resin emulsion, because the superior effects of the present invention (particularly the injection property) are obtained.

The method for producing the resin emulsion is not particularly limited. A commercially available product may be used as the resin emulsion.

The resin emulsion can be used alone or as a mixture of two or more types.

Content 1 of Solid Matter in Rubber Latex

When the tire puncture sealant of the present invention contains the rubber latex, the content 1 of the solid matter in the rubber latex is preferably from 2 to 45 mass % of the total amount of the tire puncture sealant, more preferably from 4 to 36 mass %, because the superior effects (particularly the sealing property) of the present invention are obtained.

Content 2 of Solid Matter in Resin Emulsion

When the tire puncture sealant of the present invention contains the resin emulsion, the content 2 of the solid matter in the resin emulsion is preferably from 1 to 20 mass % of the total amount of the tire puncture sealant, more preferably from 1 to 10 mass %, still more preferably from 3 to 8 mass %, because the superior effects (particularly the injection property) of the present invention are obtained.

Total Amount of Content 1 of Solid Matter in Rubber Latex and Content 2 of Solid Matter in Resin Emulsion When the tire puncture sealant of the present invention contains the rubber latex and the resin emulsion, the total amount of the content 1 of the solid matter in the rubber latex and the content 2 of the solid matter in the resin emulsion is preferably from 3 to 65 mass % of the total amount of the tire puncture sealant, more preferably from 10 to 50 mass %, still more preferably from 20 to 40 mass %, because the superior effects of the present invention (particularly the sealing property and the injection property) are obtained.

In addition, when the tire puncture sealant of the present invention contains the rubber latex and the resin emulsion, the content 2 of the solid matter in the resin emulsion is preferably from 0.1 to 100 parts by mass based on 100 parts by mass of the content 1 of the solid matter in the rubber latex, more preferably from 10 to 80 parts by mass, because the superior effects of the present invention (particularly the injection property) are obtained.

Cellulose Fiber

The tire puncture sealant of the present invention contains cellulose fibers having a maximum fiber diameter of less than 1000 nm. The cellulose fibers have cellulose, which may have a functional group.

In the present invention, the cellulose fiber refers to a bundle of multiple celluloses.

In the present invention, the fiber diameter of the cellulose fiber refers to a short diameter of one cellulose fiber. The maximum fiber diameter of a cellulose fiber refers to a diameter of the thickest portion of one cellulose fiber.

The length of the cellulose fibers refers to a major axis of one cellulose fiber.

Note that, in the present invention, the cellulose fiber may have a functional group. The functional group that may be included in the cellulose fiber is the same functional group as the functional group that may be included in the cellulose forming the cellulose fiber. When the cellulose has the functional group, the cellulose fiber has the functional group.

The cellulose fiber or cellulose forming the fiber may have, for example, negative or positive ions. When the cellulose fiber or cellulose forming the fiber has the functional group, the functional group may form a negative or positive ion.

In that case, the cellulose fiber or the cellulose forming the fiber may also have counter ions. The counter ion is not particularly limited.

One preferred aspect is that the cellulose fiber or cellulose forming the fiber has the negative ion.

In the present invention, the fiber diameter or the length of the cellulose fiber can be measured by the following method.

First, a water dispersion of fine cellulose having a solid content ratio of from 0.05 to 0.1 mass % is prepared, and the dispersion is cast onto a grid coated with a carbon film which has been subjected to a hydrophilic treatment to form a sample for observation. Next, the fiber diameter or the length of the cellulose fiber can be determined by observing the aforementioned sample for observation at a magnification from 500 to 5000 times using a scanning electron microscope (SEM), a transmission electron microscope (TEM), an atomic force microscope (AFM), or the like.

Maximum Fiber Diameter of Cellulose Fiber

The maximum fiber diameter of the cellulose fiber is a measurement value obtained by observing the sample for observation at the magnification described above in SEM or the like, arbitrarily selecting 120 cellulose fibers from among them, and measuring the fiber diameter of the thickest portion of each of the selected cellulose fibers.

Number Average Fiber Diameter of Cellulose Fiber

The number average fiber diameter of the cellulose fibers is a value obtained by observing the sample for observation at the magnification described above in SEM and the like, arbitrarily selecting 120 cellulose fibers from the selected from among them, measuring the fiber diameter of the tip portion of the selected cellulose fiber, and averaging the obtained measurement values.

Average Length of Cellulose Fiber

The average length of the cellulose fibers is a value obtained by observing the sample for observation at the magnification described above in SEM or the like, arbitrarily selecting 120 cellulose fibers from among them, measuring the length of the selected cellulose fiber, and averaging the obtained measurement values.

The maximum fiber diameter of the cellulose fibers is preferably 500 nm or less, more preferably 30 nm or less because the superior effects of the present invention (particularly the injection property) are obtained.

The number average fiber diameter of the cellulose fibers is preferably from 2 to 300 nm, more preferably from 2 to 150 nm, still more preferably from 2 to 100 nm, particularly preferably from 2 to 20 nm, because the superior effects of the present invention (particularly the injection property) are obtained.

The average length of the cellulose fibers is preferably from 10 to 150,000 nm, more preferably from 20 to 100000 nm because, the superior effects of the present invention (particularly the injection property) are obtained.

The (average length/number average fiber diameter) of the cellulose fibers is preferably from 5 to 1000, more preferably from 10 to 800 because the superior effects of the present invention (particularly the injection property) are obtained.

In the present invention, the cellulose fibers have cellulose which may have a functional group.

The cellulose forming the cellulose fiber preferably has the functional group.

The functional group that can be included in the cellulose may include, for example, at least one functional group selected from the group consisting of a carbonyl group and an alkoxy group.

The carbonyl group may form, for example, a carboxy group (—COOH) or an aldehyde group.

The carbonyl group may include, for example, groups represented by the formula: —CO—X.

In the above formula, X represents R, OH or H, and R represents a hydrocarbon group that may have a heteroatom. The hydrocarbon group and the hydrocarbon group are not particularly limited.

At least a part of the functional group may form a negative or positive ion. At least a part of the functional group may be, specifically, —COO$^-$, for example.

The alkoxy group is not particularly limited. An alkyl group forming the alkoxy group may be a linear, branched, or cyclic alkyl group, or may be a combination thereof. The alkyl group may have from 1 to 10 carbon atoms.

The alkoxy group may include, for example, a methoxy group, an ethoxy group, and propyl.

When the cellulose, forming the cellulose fibers, has the functional group, the functional group can be bonded directly or via an organic group to a six-membered ring forming the cellulose. The organic group may include, for example, oxygen atom, hydrocarbon groups, and combinations thereof. Specific examples may include —O—$CH_2$—, —$CH_2$—O—$CH_2$—, and —$CH_2$—.

The cellulose forming the cellulose fibers may have a hydroxyl group (e.g., a hydroxyl group derived from cellulose).

The cellulose forming the cellulose fibers may have the functional group described above, or the functional group and hydroxyl group described above.

The content (mol) of the functional groups is preferably from 0.1 to 2.2 mmol/g based on the weight of the cellulose fiber, more preferably from 0.5 to 2.0 mmol/g, because the superior effects of the present invention and excellent dispersibility are obtained.

Here, in the present invention, when the cellulose fiber has cellulose having the functional group wherein the functional group is a carbonyl group (specifically, a carboxy group or an aldehyde group), the amount (mmol/g) of the aldehyde groups and the carboxy groups in the cellulose to the weight of the cellulose fiber can be evaluated by the following method.

60 ml of from 0.5 to 1 mass % slurry was prepared from the sample of the cellulose fiber, whose dry weight has been precisely weighed, the pH thereof is adjusted to approximately 2.5 using a 0.1 M aqueous hydrochloric acid solution, then a 0.05 M aqueous sodium hydroxide solution is added dropwise, and an electrical conductivity measurement is conducted. The measurement is continued until the pH becomes approximately 11. The amount 1 of the functional groups is determined from an amount (V) of sodium hydroxide consumed in the neutralization stage of the weak acid in which the change in the electrical conductivity is gentle, using the formula described below. The amount 1 of the functional groups indicates an amount of the carboxy groups.

Amount 1 of functional groups (mmol/g)=$V$ (ml)× 0.05/mass of cellulose (g)

Next, the cellulose sample is oxidized at room temperature for an additional 48 hours in a 2% aqueous sodium chlorite solution whose pH is adjusted to from 4 to 5 with acetic acid, and an amount 2 of the functional groups is again measured by the above method. The amount of the functional groups added by this oxidation (=the amount 2 of the functional groups the amount 1 of the functional groups) is calculated, which is used as the amount of the aldehyde groups.

A method for producing the cellulose fiber is not particularly limited. Examples thereof include known methods.

As a method for producing cellulose fibers formed from cellulose containing functional groups, a method may include in which using, for example, a starting cellulose having no functional groups (for example, starting cellulose fibers), at least a part or all of hydroxyl groups contained in the starting cellulose are replaced by the functional group described above in a known manner.

The cellulose fiber may be water-soluble or water-insoluble. The cellulose fiber may be used in a dry state.

The form of the cellulose fiber is not particularly limited. Examples thereof may include powders, gel, aqueous solutions, and dispersions. When the cellulose fiber is, for example, in the state of a gel, an aqueous solution, or a dispersion, a medium applied to the cellulose fiber (for example, the dispersion medium) is not particularly limited. Examples thereof may include water.

The cellulose fibers may be used alone, or a combination of two or more types.

The content of the cellulose fiber (net cellulose fiber) is preferably from 0.01 to 10.0 parts by mass, based on 100 parts by mass of the content 1 of the solid matter in the rubber latex, or 100 parts by mass of the content 2 of the solid matter in the resin emulsion, more preferably from 0.01 to 5.0 parts by mass, still more preferably from 0.1 to 2.0 parts by mass, because the superior effects of the present invention (particularly the injection property) are obtained.

When the tire puncture sealant of the present invention contains the rubber latex and the resin emulsion, the cellulose fibers is contained in a content of preferably from 0.01 to 10.0 parts by mass, based on 100 parts by mass of the total amount of the content 1 of the solid matter in the rubber latex and the content 2 of the solid matter in the resin emulsion, more preferably from 0.01 to 5.0 parts by mass, still more preferably from 0.05 to 4.0 parts by mass, because the superior effects of the present invention (particularly the injection property) are obtained.

An example of a preferable aspect is one in which the cellulose fibers are dispersed in the medium of the tire puncture sealant of the present invention.

Anti-Freezing Agent

The tire puncture sealant of the present invention may further contain an anti-freezing agent.

The anti-freezing agent is not particularly limited.

The anti-freezing agent preferably is at least one agent selected from the group consisting of ethylene glycol, propylene glycol, diethylene glycol and glycerin because the injection property is excellent at a low temperature.

The content of the anti-freezing agent is preferably from 10 to 80 mass %, relative to the total amount of the tire puncture sealant, more preferably from 30 to 60 mass %, because the injection property is excellent at a low temperature.

Surfactant

The tire puncture sealant of the present invention may further contain a surfactant if required.

The surfactant is not particularly limited. Examples thereof may include nonionic, anionic, cationic, and amphoteric surfactants.

The nonionic surfactant may include, for example, nonionic surfactants of polyoxyethylene alkyl ether, polyoxyethylenealkyl phenyl ether, polyoxyethylenealkyl amine, polyoxyethylenealkyl amide, polyoxyethylene fatty acid ester, polyoxyethylene castor oil, polyoxyethylene fatty acid diester, polyoxyethylene rosin ester, polyoxyethylene lanolin ether, polyoxyethylene polyhydric alcohol ether, polyoxyethylene polyhydric alcohol fatty acid ester, polyhydric alcohol fatty acid ester, fatty acid alkanolamide, or the like. The nonionic surfactant has preferably an HLB from 12.0 to 19.0.

HLB refers to a calculated value obtained in an Osa-shiki based on an organic concept diagram, and the calculation method is described, for example, in "Technology for Emulsification and Solubilization" (in 1976, Kougaku Tosho Co., Ltd.). Furthermore, an organic value and an inorganic value, used for deriving the HLB, can be calculated using an "inorganic group table" (the values reported by Fujita et al. in 1974) described in "Organic Schematic Chart—foundation and application—" (in 1984, Sankyo Shuppan Co., Ltd.).

The polyoxyethylene alkyl ether may include, for example, polyoxyethylene decyl ether, polyoxyethylene lauryl ether, polyoxyethylene cetyl ether, polyoxyethylene stearyl ether, polyoxyethylene oleyl ether, polyoxyethylene 2-ethylhexyl ether, polyoxyethylene isodecyl ether, polyoxyethylene tridecyl ether, and polyoxyethylene isostearyl ether.

The anionic surfactant may include, for example, alkyl sulfates (such as sodium lauryl sulfate), alkyl ether sulfates, polyoxyethylene alkyl ether sulfates, polyoxyethylene alkyl phenyl ether sulfates, alkylbenzene sulfonates, alkylnaphthalene sulfonates, salts of higher fatty acids (soaps), α-sulfofatty acid methyl ester salts, α-olefin sulfonates, alkane sulfonates, (mono)alkyl phosphates, polyoxy-mono and di-styryl phenyl ether sulfosuccinate monoester salts, and alkyl phenoxypolyoxyethylene propyl sulfonates.

The cationic surfactant may include, for example, tetraalkyl ammonium chloride, trialkylbenzyl ammonium chloride, alkyl amines, monooxyethylene alkyl amines, and polyoxyethylene alkyl amines.

The surfactant preferably contains at least one surfactant selected from the group consisting of the nonionic surfactants and the anionic surfactants, because the superior effects of the present invention (particularly the storage property) are obtained.

With respect to the combination of the cellulose fiber and the surfactant, the surfactant preferably includes at least one surfactant selected from the group consisting of the nonionic surfactants and the anionic surfactants, more preferably the anionic surfactant, because the superior effects of the present invention are obtained.

The amount of the surfactant is preferably from 0.1 to 10 parts by mass based on 100 parts by mass of the content 1 of the solid matter in the rubber latex, 100 parts by mass of the content 2 of the solid matter in the resin emulsion, or 100 parts by mass of the total amount of the content 1 and the content 2, because the superior effects of the present invention (particularly the storage property) are obtained.

Other Components

In addition to the components described above, the tire puncture sealant of the present invention may optionally contain additives such as fillers, anti-aging agents, antioxidants, pigments, plasticizers, thixotropic agents, UV absorbents, flame retardants, dispersants, dehydrating agents, antistatic agents, gelling agents, and tackifiers.

When the tire puncture sealant of the present invention further contains the tackifier, it is possible to further improve the sealing property.

The tackifier may include, for example, terpene-based resins, phenol-based resins, rosin-based resins, polyvinyl esters, polyvinyl alcohols, and polyvinyl pyrrolidine.

The form of the tackifier is not particularly limited. For example, it may include an emulsion containing the tackifier as a solid matter (an oil-in-water emulsion).

An example of a preferable aspect of the tackifier is one in which the rubber latex (for example, a natural rubber latex) is not coagulated when the tire puncture sealant of the present invention is stored or manufactured.

The content of the tackifier is preferably from 1.0 to 30.0 mass %, relative to the total amount of the tire puncture sealant, more preferably from 5.0 to 10.0 mass %, because the superior effects of the present invention are obtained.

An example of a preferable aspect is one in which the tire puncture sealant of the present invention does not contain cellulose fibers having a maximum fiber diameter of 1,000 nm or more. In that case, the content of cellulose fibers having a maximum fiber diameter of 1000 nm or greater can be adjusted to from 0 to 5 mass % relative to the total amount of the tire puncture sealant.

Production Method

The method for producing the tire puncture sealant of the present invention is not particularly limited. The method may include, for example, a production method in which the rubber latex, the resin emulsion, and the cellulose fibers are mixed together with the anti-freezing agent, the surfactant, and the additive, which may be optionally used, in a mixer such as a blending mixer under a reduced pressure.

Additional water may be added into the system as needed.

In addition, when each component described above contains a dispersion medium or a medium, a component from which some or all of the dispersion medium is removed may be used as each component.

Amount of Water Contained in Tire Puncture Sealant

The tire puncture sealant of the present invention contains water in a content (a total amount of water) of preferably from 10 to 40 mass % relates to the total amount of the tire puncture sealant, more preferably from 15 to 30 mass %.

An example of a preferable aspect is one in which the cellulose fibers are dispersed in the medium of the tire puncture sealant of the present invention.

The tire puncture sealant of the present invention can seal a puncture hole of a tire.

The method of using the tire puncture sealant of the present invention is not particularly limited. Examples thereof include known methods. Specifically, for example, the tire puncture sealant of the present invention is injected into a tire from a valve of the tire using a compressor, or the like. Thereafter, when a vehicle is driven to rotate the tire, the solid matter in the rubber latex (and/or the resin emulsion) contained in the tire puncture sealant of the present invention is coagulated, and the coagulated solid matter seals the puncture hole to return the punctured tire to a state in which the tire is re-driven again.

The temperature at which the tire puncture sealant of the present invention is used is not particularly limited, and it can be used under wide temperature range conditions. For example, the working temperature may be adjusted to from −40 to 80° C.

The tire puncture sealant of the present invention can be stored for an extended period of time and/or in a wide temperature range, for example, as described above.

EXAMPLES

The present invention is described below in detail using examples. However, the present invention is not limited to such examples.

Production of Tire Puncture Sealant

Components shown in Table 1 below were mixed in a mixer in compositions (part by mass) shown in Table 1 to produce tire puncture sealants.

Two numbers shown in the column "Rubber Latex" in Table 1 relate to (an amount of the rubber latex used)/(a content of solid matter (rubber) in the rubber latex used).

Two numbers shown in the column "Resin Emulsion" in Table 1 relate to (an amount of the resin emulsion used)/(a content of solid matter (resin) in the resin emulsion used).

A number in the column "Cellulose Fiber 1" in Table 1 relates to a net content of a cellulose fiber contained in cellulose fiber 1 used. The same applies to cellulose fibers 2 and 3, and comparative cellulose fibers.

Evaluation

The following evaluations were performed using the composition produced as described below. The results are shown in Table 1.

Storage Property

The tire puncture sealant produced as described above was stationarily stored in an environment at 70° C., the tire puncture sealant was visually observed every 10 days, and whether or not a membrane (cream) was spread on the surface layer of the tire puncture sealant was confirmed. The number of days from the start of observation to the day at which the membrane was observed was described in the column "storage property".

Evaluation Criteria

The superior the storage property, the longer the number of days.

Sealing Property

A puncture hole (diameter: 4 mm) was made in a shoulder portion of a tread of a 215/60 R16 tire.

Next, the punctured tire was mounted on a drum testing machine, 650 mL of the tire puncture sealant, produced as above, was injected via a valve core of the tire, and the tire was then filled with air until the internal pressure of the tire reached 200 kPa.

The tire was then repeatedly subjected to intermittent driving in which the tire was driven at a speed of 30 km/h under a load of 350 kg and then stopped, until no air permeation was observed to measure a running distance until the tire puncture was repaired (a puncture repair distance). Whether air leakage occurred was confirmed by spraying soapy water onto the puncture hole and observing whether or not a foam of the soapy water was generated.

Evaluation Criteria

The superior the sealing property, the shorter the puncture repair distances.

Injection Property

The tire puncture sealant 650 mL produced as described above was heated to 70° C.

Using a compressor, the tire puncture sealant was injected into a 195/65 R15 tire (having a puncture hole (a diameter of 4 mm) in the shoulder portion of a tread thereof) from a valve core at an injection pressure of 300 kPa, and a time from the start of injection to the completion of the injection was measured.

Evaluation Criteria

The superior the injection property, the shorter the injection time.

Surfactant: anionic surfactant, Sodium lauryl sulfate (trademark: Emal 10PT, available from Kao Corporation)

Cellulose fiber 1: cellulose fiber. A maximum fiber diameter of 10 nm, a number average fiber diameter of 5 nm, an average length of 50 nm. It contains carbonyl groups. Carbonyl group content: 1.0 mmol/g. trademark: Rheocrysta, available from DKS Co., Ltd. Cellulose fiber content: 2.0 mass %. The cellulose fiber 1 has negative ions.

Cellulose fiber 2: cellulose fiber. A maximum fiber diameter of 500 nm, a number average fiber diameter of 250 nm, an average length of 800 nm. It contains carbonyl groups. Trade name: Cellulose Nanofiber, available from Daio Paper Corporation. Water dispersion.

TABLE 1

| Table 1 | | Example | | | | | | | | | Comparative Example | | | | |
|---|---|---|---|---|---|---|---|---|---|---|---|---|---|---|---|
| | | 1 | 2 | 3 | 4 | 5 | 6 | 7 | 8 | 9 | 1 | 2 | 3 | 4 | 5 |
| Rubber latex | NR latex | 100/60 | 100/60 | 100/60 | 100/60 | 100/60 | 100/60 | 100/60 | 100/60 | 167/100 | 100/60 | 100/60 | 100/60 | 167/100 | 0 |
| Resin emulsion | VEVA | 80/40 | 80/40 | 80/40 | 80/40 | 80/40 | 80/40 | 80/40 | 80/40 | | 80/40 | 80/40 | 80/40 | 0 | 250/100 |
| Anti-freezing agent | Propylene glycol | 100 | 100 | 100 | 100 | 100 | 100 | 100 | 100 | 100 | 100 | 100 | 100 | 100 | 100 |
| Surfactant | Alkyl sulfate | 5 | 5 | 5 | 5 | 5 | 5 | 5 | 5 | 5 | 5 | 5 | 5 | 5 | 5 |
| Cellulose fiber 1 | Maximum fiber diameter of 10 nm, carbonyl group-containing | 0.01 | 5 | 10 | | | | | | 5 | | | | | |
| Cellulose fiber 2 | Maximum fiber diameter of 500 nm, carbonyl group-containing | | | | 0.01 | 5 | 10 | | | | | | | | |
| Cellulose fiber 3 | Maximum fiber diameter of 500 nm, methoxy group-containing | | | | | | | 0.01 | 5 | | | | | | |
| Comparative cellulose fiber | Maximum fiber diameter of 3000 nm, carbonyl group-containing | | | | | | | | | | | 0.01 | 5 | | |
| Storage property/day | | 90 | 150 | 180 | 80 | 120 | 150 | 80 | 100 | 140 | 40 | 50 | 40 | 30 | 180 |
| Sealing property/km | | 4 | 6 | 10 | 4 | 7 | 10 | 5 | 5 | 4 | 5 | 5 | 4 | 3 | 30 |
| Injection property/second | | 20 | 20 | 20 | 25 | 30 | 20 | 25 | 35 | 25 | 150 | 150 | 140 | 180 | 20 |

Details of the components described in Table 1 are as follows.

Rubber latex: Natural rubber latex (Hytex HA, manufactured by Fulflex, Inc. and available from Nomura Trading Co., Ltd.; Solid content=60 mass %)

Resin emulsion: Vinyl versatate-ethylene-vinyl acetate copolymer resin emulsion (Sumikaflex 950HQ, available from Sumika Chemtex Co., Ltd.; Solid content=approximately 50 mass %)

Anti-freezing agent: Propylene glycol (available from ADEKA Corporation, industrial propylene glycol)

Cellulose fiber 3: cellulose fiber. A maximum fiber diameter of 500 nm, a number average fiber diameter of 200 nm, an average length of 500 nm. It contains methoxy groups. Trade name: Modified Cellulose Nanofiber, available from Nippon Paper Industries Co., Ltd. Cellulose fiber content: 2 mass %.

Comparative cellulose fiber: cellulose fiber. A maximum fiber diameter of 3000 nm, a number average fiber diameter of 2000 nm. It contains carbonyl groups. Trade name: Metolose LH-32, available from Nippon Paper Industries Co., Ltd. Cellulose fiber content: 100 mass %.

As is clear from the results shown in Table 1, in Comparative Examples 1 and 2 in which the predetermined cellulose fiber were not contained and, instead thereof, the comparative cellulose fibers with a maximum fiber diameter of 1000 nm or greater were used, the storage property and the injection property were poor.

In Comparative Example 3 in which the predetermined cellulose fibers were not contained, the storage property and the injection property were poor.

In Comparative Example 4 in which the resin emulsion and the predetermined certain cellulose fibers were not contained, the storage property and the injection property were poor.

In Comparative Example 5 in which the rubber latex and the predetermined cellulose fibers were not contained, the sealing property was poor.

On the other hand, the tire puncture sealant of the present invention had the excellent storage property, sealing property and injection property.

The invention claimed is:

1. A tire puncture sealant comprising: a rubber latex and/or a resin emulsion; and a cellulose fiber having a maximum fiber diameter of less than 1000 nm, the cellulose fiber containing cellulose that optionally has a functional group.

2. The tire puncture sealant according to claim 1, wherein the cellulose fiber has a number average fiber diameter from 2 to 150 nm.

3. The tire puncture sealant according to claim 1, wherein the cellulose fiber is contained in a content from 0.01 to 5.0 parts by mass, based on 100 parts by mass of a content 1 of solid matter in the rubber latex, or 100 parts by mass of a content 2 of solid matter in the resin emulsion.

4. The tire puncture sealant according to claim 1, wherein the cellulose fiber has a maximum fiber diameter of 500 nm or less, and a number average fiber diameter from 2 to 100 nm.

5. The tire puncture sealant according to claim 1, wherein the cellulose fiber has a maximum fiber diameter of 30 nm or less, and a number average fiber diameter from 2 to 20 nm.

6. The tire puncture sealant according to claim 1, wherein the functional group is at least one selected from the group consisting of a carbonyl group and an alkoxy group.

7. The tire puncture sealant according to claim 1, wherein the cellulose fiber contains cellulose having a functional group, and the functional group is contained in a content from 0.1 to 2.2 mmol/g relative to the cellulose fiber.

8. The tire puncture sealant according to claim 1, wherein the cellulose fiber is dispersed in a medium of the tire puncture sealant.

9. The tire puncture sealant according to claim 1, comprising the rubber latex and the resin emulsion, wherein the cellulose fiber is contained in a content from 0.01 to 10.0 parts by mass, based on 100 parts by mass of a total amount of the content 1 of the solid matter in the rubber latex and the content 2 of the solid matter in the resin emulsion.

10. The tire puncture sealant according to claim 2, wherein the cellulose fiber is contained in a content from 0.01 to 5.0 parts by mass, based on 100 parts by mass of a content 1 of solid matter in the rubber latex, or 100 parts by mass of a content 2 of solid matter in the resin emulsion.

11. The tire puncture sealant according to claim 2, wherein the cellulose fiber has a maximum fiber diameter of 500 nm or less, and a number average fiber diameter from 2 to 100 nm.

12. The tire puncture sealant according to claim 2, wherein the cellulose fiber has a maximum fiber diameter of 30 nm or less, and a number average fiber diameter from 2 to 20 nm.

13. The tire puncture sealant according to claim 2, wherein the functional group is at least one selected from the group consisting of a carbonyl group and an alkoxy group.

14. The tire puncture sealant according to claim 2, wherein the cellulose fiber contains cellulose having a functional group, and the functional group is contained in a content from 0.1 to 2.2 mmol/g relative to the cellulose fiber.

15. The tire puncture sealant according to claim 2, wherein the cellulose fiber is dispersed in a medium of the tire puncture sealant.

16. The tire puncture sealant according to claim 2, comprising the rubber latex and the resin emulsion, wherein the cellulose fiber is contained in a content from 0.01 to 10.0 parts by mass, based on 100 parts by mass of a total amount of the content 1 of the solid matter in the rubber latex and the content 2 of the solid matter in the resin emulsion.

17. The tire puncture sealant according to claim 3, wherein the cellulose fiber has a maximum fiber diameter of 500 nm or less, and a number average fiber diameter from 2 to 100 nm.

18. The tire puncture sealant according to claim 3, wherein the cellulose fiber has a maximum fiber diameter of 30 nm or less, and a number average fiber diameter from 2 to 20 nm.

19. The tire puncture sealant according to claim 3, wherein the functional group is at least one selected from the group consisting of a carbonyl group and an alkoxy group.

20. The tire puncture sealant according to claim 3, wherein the cellulose fiber contains cellulose having a functional group, and the functional group is contained in a content from 0.1 to 2.2 mmol/g relative to the cellulose fiber.

* * * * *